United States Patent Office 3,423,416
Patented Jan. 21, 1969

3,423,416
NOVEL AROMATIC N-HETEROCYCLIC ESTERS OF DIARYLCARBAMOYL OR DIARYLTHIO-CARBAMOYL HALIDES
Asher A. Hyatt, Lexington, Mass., assignor to Monsanto Research Corporation, St. Louis, Mo., a corporation of Delaware
No Drawing. Filed Dec. 3, 1965, Ser. No. 511,519
U.S. Cl. 260—294.8    3 Claims
Int. Cl. C07d 31/34; A61k 27/00

ABSTRACT OF THE DISCLOSURE

Novel aromatic N-heterocyclic esters of diarylcarbamoyl or diarylthiocarbamoyl halides of the following formula:

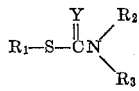

wherein $R_1$ is a 2 pyridyl radical, Y is oxygen or sulfur and $R_2$ and $R_3$ are phenyl radicals, lower alkyl substituted phenyl radicals, phenethyl radicals and naphthyl radicals. Compounds are useful as biological toxicants.

---

This invention relates to the reaction of aromatic N-heterocyclic substituted mercaptans and alkali metal derivatives thereof with diarylcarbamoyl or diarylthiocarbamoyl halides and to the products thereof.

It is an object of this invention to provide new aromatic N-heterocyclic esters of diarylthio and diaryldithiocarbamic acids.

It is another object of this invention to provide biological toxicants such as bactericides.

These and other objects of this invention will become apparent as a detailed description of the invention proceeds.

According to the invention, there are prepared new and useful compounds having the formula:

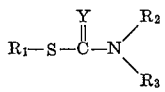

wherein $R_1$ represents organic radicals having one heterocyclic nitrogen atom and from 5 to 10 carbon atoms, Y is a member selected from the class consisting of oxygen and sulfur, and each of $R_2$ and $R_3$ represents aromatic hydrocarbon radicals of from 6 to 12 carbon atoms.

Preparation of the presently provided novel compounds may be effected by many differing methods. A convenient method where solvents are used is to add before, during, or after the diarylcarbamoyl or diarylthiocarbamoyl halide is contacted with the aromatic N-heterocyclic substituted mercaptan, a halogen-scavenger like the alkali metal derivatives of primary alcohols, such as lithium methoxide, sodium ethoxide, and potassium propoxide, for example, as illustrated by the folowing equation.

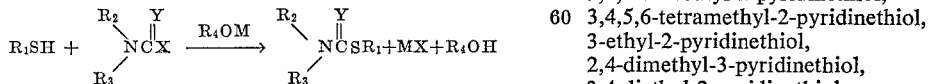

wherein $R_1$, $R_2$, $R_3$, and Y are as defined above, $R_4$ is a lower alkyl group, M is an alkali metal selected from the class consisting of sodium, lithium, and potassium, and X is a halogen element of atomic weight below 130.

Another convenient method is to contact the diarylcarbamoyl or diarylthiocarbamoyl halide with an aromatic N-heterocyclic substituted mercaptide, according to the following equation:

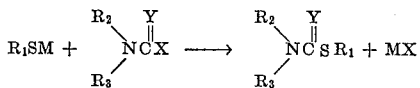

wherein $R_1$, $R_2$, $R_3$, Y, M, and X are as defined above.

There are shown below a number of the specific new compounds of the invention. It is not intended that this be a complete listing of all the compounds of the invention, but that it merely be illustrative thereof: S-2-pyridyl-N,N-diphenylthiocarbamate, S - 3-methyl-2-pyridyl-N,N-ditolyldithiocarbamate, S-3,4-dimethyl-2-pyridyl-N,N-dixylylthiocarbamate, S-3,4,5-trimethyl-2-pyridyl-N,N-dinaphthyldithiocarbamate, S-3,4,5,6-tetramethyl-2-pyridyl-N,N-ditolyldithiocarbamate, S-3,4-dimethyl-2-pyridyl-N-tolyl-N-phenyldithiocarbamate, S - 2,4-dimethyl-3-pyridyl-N-xylyl-N-tolyldithiocarbamate, S-3,4-diethyl-2-pyridyl-N,N-dibenzyldithiocarbamate, S - 3,4-diethyl-5-methyl-2-pyridyl-N-naphthyl-N-xylylthiocarbamate, S - 4 - ethyl-5-methyl - 2 - pyridyl - N-biphenylyl-N-naphthyldithiocarbamate, S - 4-ethyl-6-propyl-2-pyridyl-N-xylyl-N-m-ethylphenylthiocarbamate, S - 5 - propyl-2-pyridyl-N-p-methylbenzyl-N-tolyldithiocarbamate, S - 3 - methyl-5-propyl-2-pyridyl-N-o-ethylphenyl-N-benzylthiocarbamate, S-5,6-dimethyl - 4 - propyl - 2-pyridyl-N-2,3-dimethylbenzyl-N-xylyldithiocarbamate, S - 4 - butyl-2-pyridyl-N-m-propylphenyl-N-o-ethylphenylthiocarbamte, S - 3 - pyridyl - N-napthyl-N-2,3-dimethylbenzylthiocarbamate, S-4-pyridyl-N-biphenylyl-N-butylphenyldithiocarbamate, S-4,6-diethyl-2-methyl-3-pyridyl-N-naphthyl - N-p-butylphenyldithiocarbamate, S - 2-ethyl-6-propyl-4-pyridyl-N-m-isopropylbenzyl-N-2,4-dimethylbenzyldithiocarbamate, S-5-methyl-3-pyridyl-N-o-butylphenyl-N-xylylthiocarbamate, S - 5 - pentyl - 3 - pyridyl - N-biphenylyl-N-2,3,4,5-tetramethylphenyldithiocarbamate, S-2-ethyl-3,5,6-trimethyl-4-pyridyl - N-2,3,5 - trimethylphenyl - N - p-ethylphenylthiocarbamate, S-2,3-dimethyl-6-propyl-4-pyridyl-N-2,4-diethylphenyl-N-tolyldithiocarbamate, S-3-pyridyl-N,N-diphenylthiocarbamate, S - 2-methyl-4-pyridyl-N,N-ditolyldithiocarbamate, S-4,6-dimethyl-3-pyridyl-N,N-dixylylthiocarbamate, S-2,3,5-trimethyl-4-pyridyl-N,N-dinaphthyldithiocarbamate, S-2,4,5,6-tetramethyl-3-pyridyl-N,N-dibiphenylylthiocarbamate, S - 3-ethyl-4-pyridyl-N-tolyl-N-phenyldithiocarbamate, S-2,5-diethyl-3-pyridyl-N-xylyl-N-tolylthiocarbamate, S - 2,6-diethyl-5-methyl-4-pyridyl-N,N-dibenzyldithiocarbamate, S-2-ethyl-5-methyl-3-pyridyl-N,N-dinaphthylthiocarbamate, and so forth.

Useful aromatic N-heterocyclic mercaptans which may be used are, for example:

2-pyridinethiol,
3-methyl-2-pyridinethiol,
3,4-dimethyl-2-pyridinethiol,
3,4,5-trimethyl-2-pyridinethiol,
3,4,5,6-tetramethyl-2-pyridinethiol,
3-ethyl-2-pyridinethiol,
2,4-dimethyl-3-pyridinethiol,
3,4-diethyl-2-pyridinethiol,
3,4-diethyl-5-methyl-2-pyridinethiol,
4-ethyl-5-methyl-2-pyridinethiol, 4-ethyl-6-propyl-2-pyridinethiol,
5-propyl-2-pyridinethiol,
3-methyl-5-propyl-2-pyridinethiol,
5,6-dimethyl-4-propyl-2-pyridinethiol,
4-butyl-2-pyridinethiol,
4-butyl-6-methyl-2-pyridinethiol,
3-pyridinethiol,
4-pyridinethiol,
4,6-diethyl-2-methyl-3-pyridinethiol,
2-ethyl-6-propyl-4-pyridinethiol,
5-methyl-3-pyridinethiol,
5-pentyl-3-pyridinethiol,
2-ethyl-3,5,6-trimethyl-4-pyridinethiol,
2,3-dimethyl-6-propyl-4-pyridinethiol, and so forth.

Useful diarylcarbamoyl and diarylthiocarbamoyl halides are, for example:

N,N-diphenylcarbamoyl chloride,
N,N-ditolylthiocarbamoyl bromide,
N,N-dixylylcarbamoyl fluoride,
N,N-dinaphthylthiocarbamoyl iodide,
N,N-dibiphenylylcarbamoyl chloride,
N-tolyl-N-phenylthiocarbamoyl bromide,
N-xylyl-N-tolylcarbamoyl fluoride,
N,N-dibenzylthiocarbamoyl iodide,
N-naphthyl-N-xylylcarbamoyl chloride,
N-biphenylyl-N-naphthylthiocarbamoyl bromide,
N-xylyl-N-m-ethylphenylcarbamoyl fluoride,
N-p-methylbenzyl-N-tolylthiocarbamoyl iodide,
N-o-ethylphenyl-N-benzylcarbamoyl chloride,
N-2,3-dimethylbenzyl-N-xylylthiocarbamoyl bromide,
N-m-propylphenyl-N-o-ethylphenylcarbamoyl fluoride,
N-2,3,5-trimethylphenyl-N-xylylthiocarbamoyl iodide,
N-naphthyl-N-2,3-dimethylbenzylcarbamoyl chloride,
N-biphenylyl-N-naphthylthiocarbamoyl bromide,
N-naphthyl-N-p-butylphenylcarbamoyl fluoride,
N-m-isopropylbenzyl-N-2,4-dimethylbenzylthiocarbamoyl iodide,
N-o-butylphenyl-N-xylylcarbamoyl chloride,
N-biphenylyl-N-2,3,4,5-tetramethylphenylthiocarbamoyl bromide,
N-2,3,5-trimethylphenyl-N-p-ethylphenylcarbamoyl fluoride,
N-2,4-diethylphenyl-N-tolylthiocarbamoyl fluoride,
N-p-propylphenyl-N-m-methylbenzylcarbamoyl iodide, and so forth.

In preparing the present compounds, the acylating agent is simply contacted with the N-heterocyclic substituted mercaptan or mercaptide. Prior, during, or after contacting the above mentioned reactants, a halogen-scavenger such as sodium ethoxide, potassium methoxide, or lithium propoxide or the like may advantageously be added in order that the alkali metal cation may scavenge the halogen evolved in the course of the reaction when an acid halide is used as the acylating agent. An amount of alkali metal which is the molar equivalent of the mercaptan present in the lesser quantity, or of either reactant where equimolar amounts are used, is suitable.

Solvents or diluents which may be used to moderate the reaction and/or to facilitate stirring the mixture, and so forth, are for example, polar solvents, such as methanol, ethanol and propanol.

The molar ratio of the N-heterocyclic compound to the acylating agent may vary from 1:10 to 10:1 though the preferred ratio is 1:1.

Useful temperatures are, for example, the reflux temperature of the reaction mixture, where low boiling solvents are employed, or from any desired temperature from about ambient temperature to below the decomposition point of the ingredients of the reaction mixture.

Atmospheric pressure is satisfactory for conducting the reaction, though sub- or superatmospheric pressures may be used if desired, ranging from 0.05 millimeters of mercury to about 5,000 pounds per square inch.

Reaction time may vary; in general, it will depend on the nature of the reactants used and on the temperature of the reaction. Ordinarily reaction time will vary from less than one minute to several hours.

The isolation of the product may be accomplished by any standard procedure, such as distillation, extraction or crystallization, for example:

The present new compounds are generally stable, well defined products, soluble in alcohols, such as methanol, ethanol, and propanol, for example.

The new compounds are useful for a variety of industrial and agricultural uses; for example, the S-2-pyridyl-N,N-diphenylthiocarbamate may be used as a biological toxicant, and is particularly effective as a mammalian toxicant, as well as possessing utility as a bactericide.

The invention will be further described with reference to the following specific examples. These examples are given for purposes of illustration only and are not to be taken as in any way restricting the invention.

Example 1

This example illustrates the preparation of a compound in accordance with this invention.

To a reaction flask containing 46.3 grams (g.) (about 0.2 mole) of N,N-diphenylcarbamoyl chloride in 600 milliliters (ml.) of warm absolute ethanol is added gradually a mixture consisting of 13.6 g. (about 0.2 mole) of sodium ethoxide and 22.2 g. (about 0.2 mole) of 2-pyridenethiol in about 600 ml. of warm absolute ethanol. Immediate reaction occurs with the formation of a white crystalline precipitate of sodium chloride. The reaction mixture is stirred for five minutes at ambient temperature to insure complete reaction, filtered to remove the salt precipitate, and cooled to about 0° C. to allow crystallization of the carbamate ester from the alcohol.

The resulting product is S-2-pyridyl-N,N-diphenylthiocarbamate, a uniformly white crystalline solid weighing 25 g. (about 40% theoretical yield) soluble in ethanol and melting at 168°–170° C.

Elemental analysis confirms the assigned empirical formula $C_{18}H_{14}N_2OS$. Calculated: C, 70.6; H, 4.6; N, 9.1. Found: C, 70.3; H, 4.6; N, 9.1.

Example 2

This example illustrates the use of a compound of this invention as a mammalian toxicant.

To test bactericidal activity, inoculations of S. typhosa are made on agar substrates supporting the growth of this organism, to which has been added S-2-pyridyl-N,N-diphenylthiocarbamate. At a one part per thousand concentration in the agar, the test compound produces substantially complete suppression of growth of the organism.

Example 3

This example illustrates the use of a compound of this invention as a mammalian toxicant.

S-2-pyridyl-N,N-diphenylthiocarbamate is placed in solution by dissolving 100 milligrams (mg.) of the compound in 10 ml. of an aqueous solution containing 10% of a polyethylene glycol having a molecular weight of 300. This solution is diluted with water to provide solutions of varying concentrations which are injected into mice intraveneously. At 316 milligrams per kilogram (mg./kg.) (31.6 ml./kg.) and 100 mg./kg. (10 ml./kg.), the animals exhibit decreased activity.

The ratio of median lethal dose to median effective dose ($LD_{50}/MED_{50}$) is calculated to be 5.62.

The new ester products are particularly useful as bactericides and mammalian toxicants and are adapted to be employed as the active toxicant constituents of compositions for the control of microbiological organisms, for example, they may be applied on leather and cloth, or added to paints, lacquers, starch pastes, creams, soaps, and so forth.

It is apparent that this invention may be extended to areas beyond those specifically described and that many widely differing embodiments can be made without departing from the spirit and scope thereof as defined herein. Therefore, it is not intended to be limited except as indicated by the appended claims.

What is claimed is:
1. A compound having the following formula:

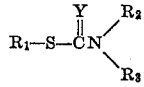

where $R_1$ is a 2 pyridyl radical, Y is oxygen or sulfur and $R_2$ and $R_3$ are radicals selected from the group consisting of a phenyl radical, a lower alkyl radical, a phenethyl radical and a naphthyl radical.

2. A compound of claim 1 in which Y is oxygen.
3. S-2-pyridyl-N,N-diphenylthiocarbamate.

References Cited

UNITED STATES PATENTS 2,553,994  5/1951  Wuest _____ 260—295.5

JOHN D. RANDOLPH, *Primary Examiner.*

A. L. ROTMAN, *Assistant Examiner.*

U.S. Cl. X.R.

260—295, 543; 167—33